(12) United States Patent
Prajapati

(10) Patent No.: US 10,754,533 B2
(45) Date of Patent: *Aug. 25, 2020

(54) SYSTEM AND METHOD OF PROVIDING SPATIOTEMPORAL VISUALIZATIONS

(71) Applicant: SAP SE, Walldorf (DE)

(72) Inventor: Rishi Prajapati, Ratlam (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/696,022

(22) Filed: Nov. 26, 2019

(65) Prior Publication Data

US 2020/0097165 A1 Mar. 26, 2020

Related U.S. Application Data

(63) Continuation of application No. 15/373,711, filed on Dec. 9, 2016, now Pat. No. 10,552,024.

(51) Int. Cl.
*G06F 3/0484* (2013.01)
*G06T 11/20* (2006.01)
(Continued)

(52) U.S. Cl.
CPC ......... *G06F 3/04847* (2013.01); *G06Q 10/00* (2013.01); *G06Q 10/06393* (2013.01); *G06T 11/206* (2013.01)

(58) Field of Classification Search
CPC .............. G06F 3/04847; G06T 11/206; G06Q 10/06393; G06Q 10/00
See application file for complete search history.

(56) References Cited

U.S. PATENT DOCUMENTS 6,486,896 B1 11/2002 Ubillos
7,765,491 B1 7/2010 Cotterill
(Continued)

OTHER PUBLICATIONS

"U.S. Appl. No. 15/373,711, Examiner Interview Summary dated Jun. 7, 2019", 3 pgs.
(Continued)

*Primary Examiner* — Nicholas Klicos
(74) *Attorney, Agent, or Firm* — Schwegman Lundberg & Woessner, P.A.

(57) ABSTRACT

Techniques of providing spatiotemporal visualizations are disclosed. In some example embodiments, a spatiotemporal visualization of at least a portion of data of a dataset is generated and displayed to a user in a graphical user interface of a device. An embodiment comprises receiving data comprising a plurality of measures and a plurality of dimensions; calculating a minimum and maximum magnitude of velocity for measures in the data; defining intervals in a range defined by the minimum and maximum velocity; selecting configuration settings for rendering a spatiotemporal visualization corresponding to the data and the intervals; generating the spatiotemporal visualization, the spatiotemporal visualization comprising a graphical representation of at least a portion of data comprising at least one of the measures and at least one of the dimensions over the defined intervals; and causing display of: the spatiotemporal visualization, and a plurality of selectable interaction controls corresponding to the spatiotemporal visualization.

20 Claims, 11 Drawing Sheets

(51) Int. Cl.
*G06Q 10/06* (2012.01)
*G06Q 10/00* (2012.01)

(56) References Cited

U.S. PATENT DOCUMENTS

| | | |
|---|---|---|
| 7,779,344 B1 | 8/2010 | Hao et al. |
| 8,209,217 B1 | 6/2012 | Griffith et al. |
| 9,576,109 B1 | 2/2017 | Grandinetti et al. |
| 2004/0021695 A1 | 2/2004 | Sauermann et al. |
| 2005/0283754 A1 | 12/2005 | Vignet |
| 2007/0247462 A1 | 10/2007 | Bell et al. |
| 2009/0002370 A1* | 1/2009 | Helfman ............ G06T 5/009 345/440 |
| 2010/0251151 A1 | 9/2010 | Alsbury et al. |
| 2011/0153508 A1 | 6/2011 | Jhunjhunwala |
| 2012/0204122 A1* | 8/2012 | Brugler ............ G06F 17/10 715/771 |
| 2016/0098177 A1 | 4/2016 | Kraut |
| 2016/0103886 A1 | 4/2016 | Prophete et al. |
| 2016/0132225 A1 | 5/2016 | Lee et al. |
| 2016/0350950 A1 | 12/2016 | Ritchie et al. |
| 2017/0371529 A1 | 12/2017 | Tandon et al. |
| 2018/0164992 A1 | 6/2018 | Prajapati |

OTHER PUBLICATIONS

"U.S. Appl. No. 15/373,711, Non Final Office Action dated May 1, 2019", 20 pgs.
"U.S. Appl. No. 15/373,711, Notice of Allowance dated Oct. 17, 2019", 16 pgs.
"U.S. Appl. No. 15/373,711, Respnose filed Jul. 8, 2019 to Non Final Office Action dated May 1, 2019", 14 pgs.

* cited by examiner

| MONTH | REVENUE | LOGISTICS | OPERATIONS | RAW MATERIALS | TAXES |
|---|---|---|---|---|---|
| JAN | 100 | 10 | 20 | 70 | 5 |
| FEB | 100 | 10 | 20 | 70 | 5 |
| MAR | 100 | 10 | 20 | 70 | 5 |
| APR | 100 | 10 | 20 | 70 | 5 |
| MAY | 50 | 60 | 20 | 70 | 5 |
| JUN | 100 | 10 | 20 | 70 | 5 |
| JUL | 50 | 10 | 70 | 70 | 5 |
| AUG | 100 | 10 | 20 | 70 | 5 |
| SEP | 150 | 10 | 20 | 20 | 5 |
| OCT | 100 | 10 | 20 | 70 | 5 |
*FIG. 7*
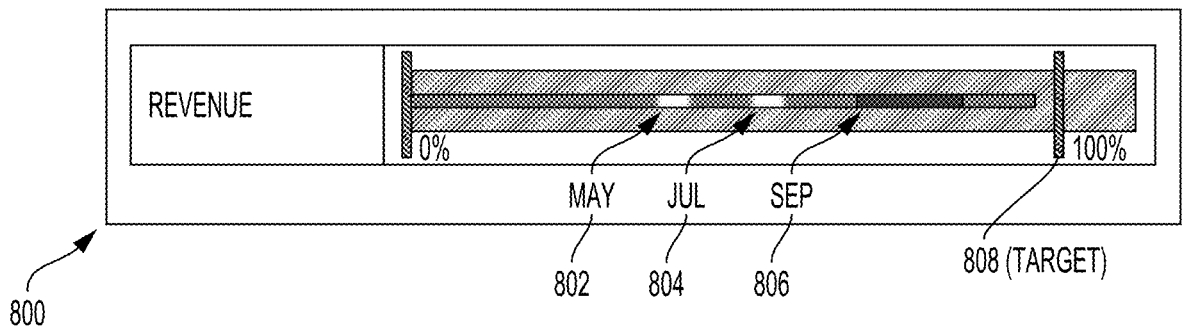
*FIG. 8*
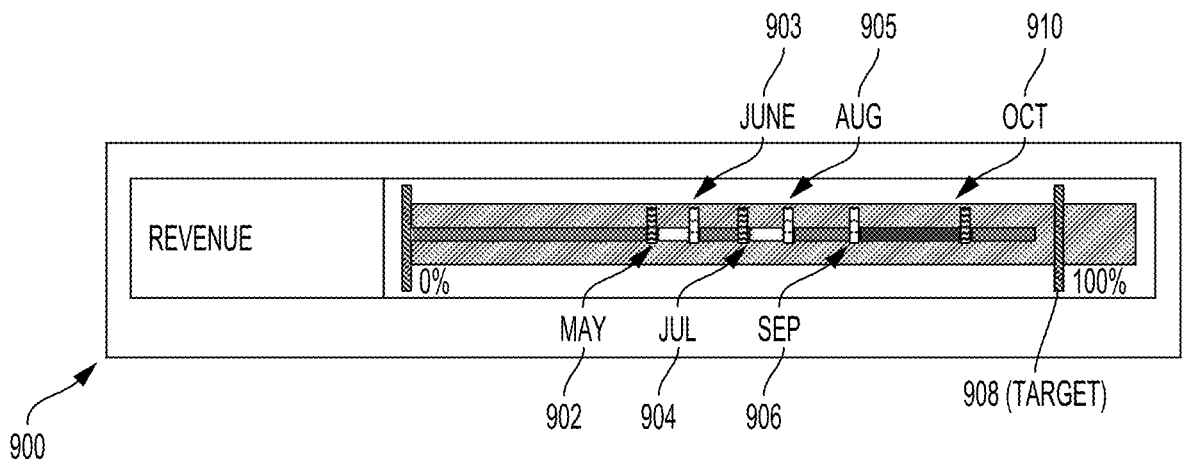
*FIG. 9*

US 10,754,533 B2

SYSTEM AND METHOD OF PROVIDING SPATIOTEMPORAL VISUALIZATIONS

PRIORITY CLAIM

This application is a continuation of U.S. application Ser. No. 15/373,711, entitled "System and Method of Providing Spatiotemporal Visualizations," filed on Dec. 9, 2016 and published as U.S. Patent Application Publication No. 2018/0164992 on Jun. 14, 2018, which application is incorporated herein by reference in its entirety.

TECHNICAL FIELD

The present application relates generally to the technical field of data processing, and, in various embodiments, to systems and methods of providing spatiotemporal visualizations.

BACKGROUND

In conventional data analysis tools, it can be difficult for analysts and business users to know what the best next step to take is or decision to make when navigating or exploring data. This feeling of being lost in the data results in a less powerful analysis experience, as well as a higher degree of frustration and, potentially, wasted time. Traditional data analysis tools provide representations of a snapshot in time for key performance indicators (KPIs) and value drivers that are used to analyze the state of set targets in analytical reporting. For example, in a conventional business report providing year to date (YTD) details about profit and expenses data, various accounting measures can be provided in a 'bullet chart' and other conventional representations. However, such representations are snapshots in time, and do not convey the performance of a plotted measures over the course of time. Conventional analytical and decision support reports merely convey 'what has happened' so far to data up to a point in time, rather than 'how it happened' across time intervals. Such reports are of limited help when an analyst tries to identify key patterns across time and space leading to the current state of the data.

BRIEF DESCRIPTION OF THE DRAWINGS

Some example embodiments of the present disclosure are illustrated by way of example and not limitation in the figures of the accompanying drawings, in which like reference numbers indicate similar elements, and in which:

FIG. 7 depicts historical data that an example visualization report can be based upon, in accordance with some example embodiments;

FIG. 8 illustrates a light streak visualization representing intervals of interest for revenue, in accordance with some example embodiments;

FIG. 9 is the light streak visualization of FIG. 8 with inflection points for revenue, in accordance with some example embodiments;

DETAILED DESCRIPTION

Figure 1:
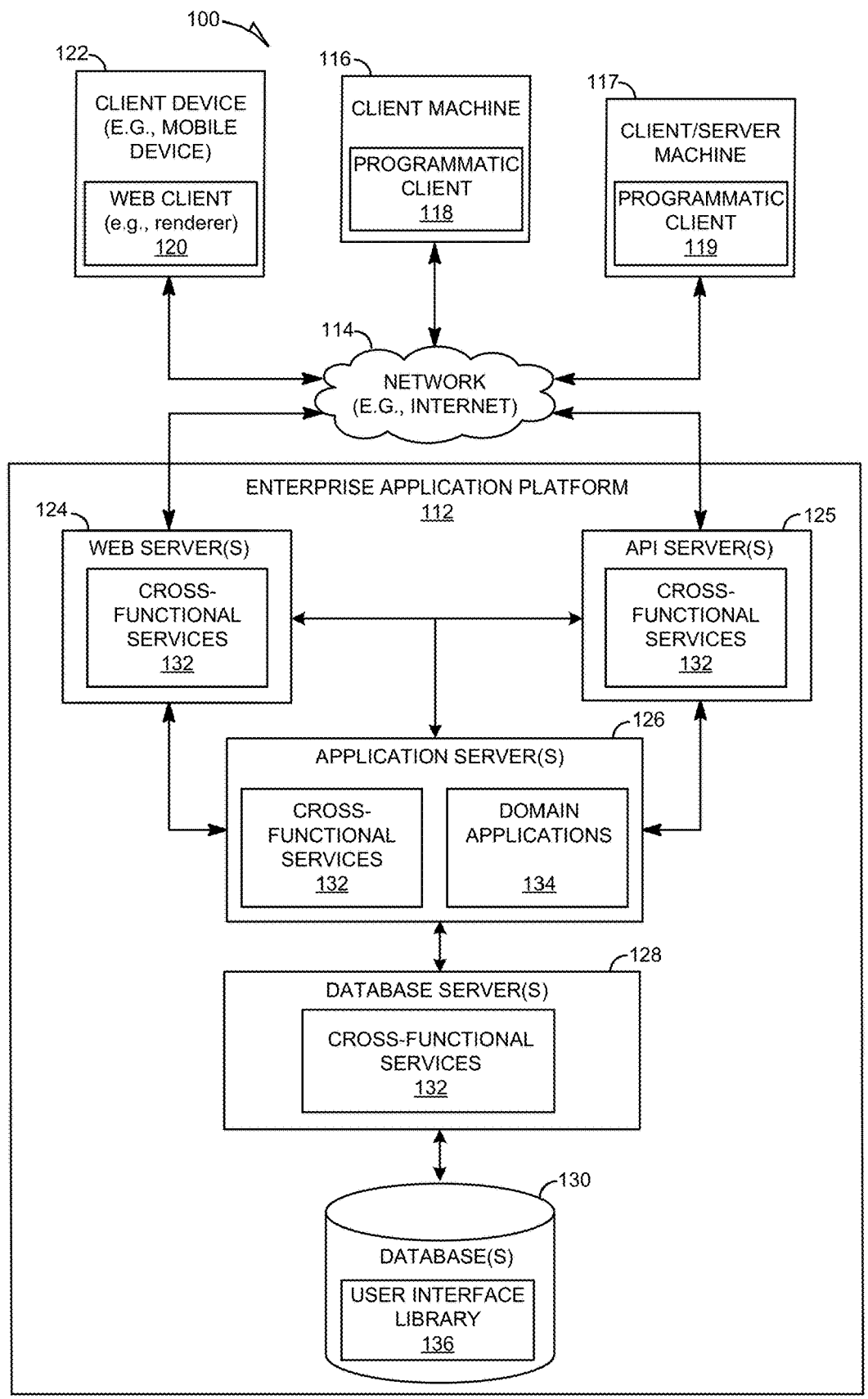
FIG. 1 is a network diagram illustrating a client-server system, in accordance with some example embodiments.

Example methods and systems of providing spatiotemporal visualizations are disclosed. In the following description, for purposes of explanation, numerous specific details are set forth in order to provide a thorough understanding of example embodiments. It will be evident, however, to one skilled in the art that the present embodiments can be practiced without these specific details.

The present disclosure provides features that assist users with decision making by representing and augmenting spatiotemporal patterns in reports. In particular, example methods and systems generate and present analytical and decision support reports in the form of spatiotemporal visualizations. In some embodiments, the spatiotemporal visualizations are presented as light streak charts that are both visually intuitive and contextually relevant. These features provide a new mode of interaction with data that makes data analysis and decision making experiences more intuitive and efficient. An improved level of assistance is provided to analysts and data scientists who are performing the very complex task of data exploration. Instead of simply providing reports that are snapshots in time and leaving it to analysts to manually identify key patterns over time leading to the current state of measured metrics via trial and error, the system of the present disclosure generates spatiotemporal representations that convey changes in the metrics over time.

In certain example embodiments, a system and method generate visualizations that convey performance of key performance indicators (KPIs) and value drivers over the course of time. For example, the system generates and displays spatiotemporal visualizations that depict, for given KPIs, 'how it happened' instead of merely showing 'what has happened' so far with the KPIs up to a point in time. That is, instead of traditional reports that simply show 'what has happened' so far with respect to a KPI, the spatiotemporal visualizations described herein enable analysts to readily ascertain 'how it happened' with respect to KPIs.

In some example embodiments, a spatiotemporal visualization of at least a portion of data of a dataset to be displayed to an analyst user in a graphical user interface of a device can be determined. The dataset can comprise a plurality of measures and a plurality of dimensions. The spatiotemporal visualization can comprise a graphical representation of the at least a portion of data. The at least a portion of data can comprise at least one of the plurality of measures and at least one of the plurality of dimensions. A plurality of spatiotemporal visualizations can be generated based on an application of interactions to the current spatiotemporal visualization. Each one of the plurality of spatiotemporal visualizations can comprise a different graphical representation of data of the dataset. Corresponding interaction controls for each one of the plurality of spatiotemporal visualizations can be displayed and used to receive selections via interactions with the controls for a spatiotemporal visualization. For a currently displayed spatiotemporal visualization, a plurality of selectable interaction controls corresponding to a displayed spatiotemporal visualization can be caused to be displayed to the user in the graphical user interface of the device.

In some example embodiments, a plurality of spatiotemporal visualizations for different measured values (e.g., revenue, taxes, raw materials, logistics) across intervals of time (e.g., weeks, months, quarters, years) can be caused to be displayed concurrently. The spatiotemporal visualizations can be caused to be displayed in a first dedicated section of the user interface for spatiotemporal visualizations, and the plurality of selectable interaction controls can be caused to be displayed in a second dedicated section of the user interface for spatiotemporal visualizations. In some example embodiments, a user selection of one of the plurality of selectable interaction controls can be detected, and the graphical representation corresponding to the selected one of the selectable interaction controls can be caused to be displayed in the first dedicated section of the user interface for spatiotemporal visualizations.

In certain example embodiments, the plurality of measures can comprise numeric values across time. Visualizations can be rendered that represent and augment spatiotemporal patterns of the measures. Such representation and augmentation of spatiotemporal patterns in the visualizations can be used for analysis and decision support.

In some example embodiments, the spatiotemporal visualization can comprise a light streak representation of magnitudes of quantity change for a measured quantity across time intervals.

In some example embodiments, a displayed spatiotemporal visualization is updated based on a user selecting at least one of a plurality of interaction controls. For instance, a spatiotemporal visualization can be modified based on user interactions with interaction controls selected in order to vary a chart type (e.g., change a light streak chart to a donut chart). In certain example embodiments, at least one interaction control can be selected by a user to provide interactions for modifying a spatiotemporal visualization. For example, at least one interaction can be determined and applied to a displayed spatiotemporal visualization in order to update the visualization. In some example embodiments, interactions corresponding to selected interaction controls for a spatiotemporal visualization can be used to modify the spatiotemporal visualization based on at least one of: explicit user selection of a time interval, a movable marker (e.g., for an inflection point), a shape change selection, a measure (e.g., a performance metric or KPI), a reference dimension (e.g., a goal or target for the measure), or chart type of the corresponding spatiotemporal visualization.

The methods or embodiments disclosed herein may be implemented as a computer system having one or more modules (e.g., hardware modules or software modules). Such modules may be executed by one or more processors of the computer system. One or more of the modules can be combined into a single module. In some example embodiments, a non-transitory machine-readable storage device can store a set of instructions that, when executed by at least one processor, causes the at least one processor to perform the operations and method steps discussed within the present disclosure.

FIG. 1 is a network diagram illustrating a client-server system 100, in accordance with some example embodiments. The client-server system 100 can be used to represent and augment spatiotemporal patterns in analytical and decision support reports. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 (e.g., a mobile device) with a web client 120 (e.g., a mobile device browser or a browser without a script engine), and a client/server machine 117 with a programmatic client 119. In the example of FIG. 1, the web client 120 can be embodied as a renderer configured to render spatiotemporal visualizations.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can implement partition-level operation with concurrent activities. For example, the enterprise application platform 112 can implement a partition-level lock, a schema lock mechanism, manage activity logs for concurrent activity, generate and maintain statistics at the partition level, and efficiently build global indexes. The enterprise application platform 112 is described in greater detail below in conjunction with FIG. 2.

Figure 2:
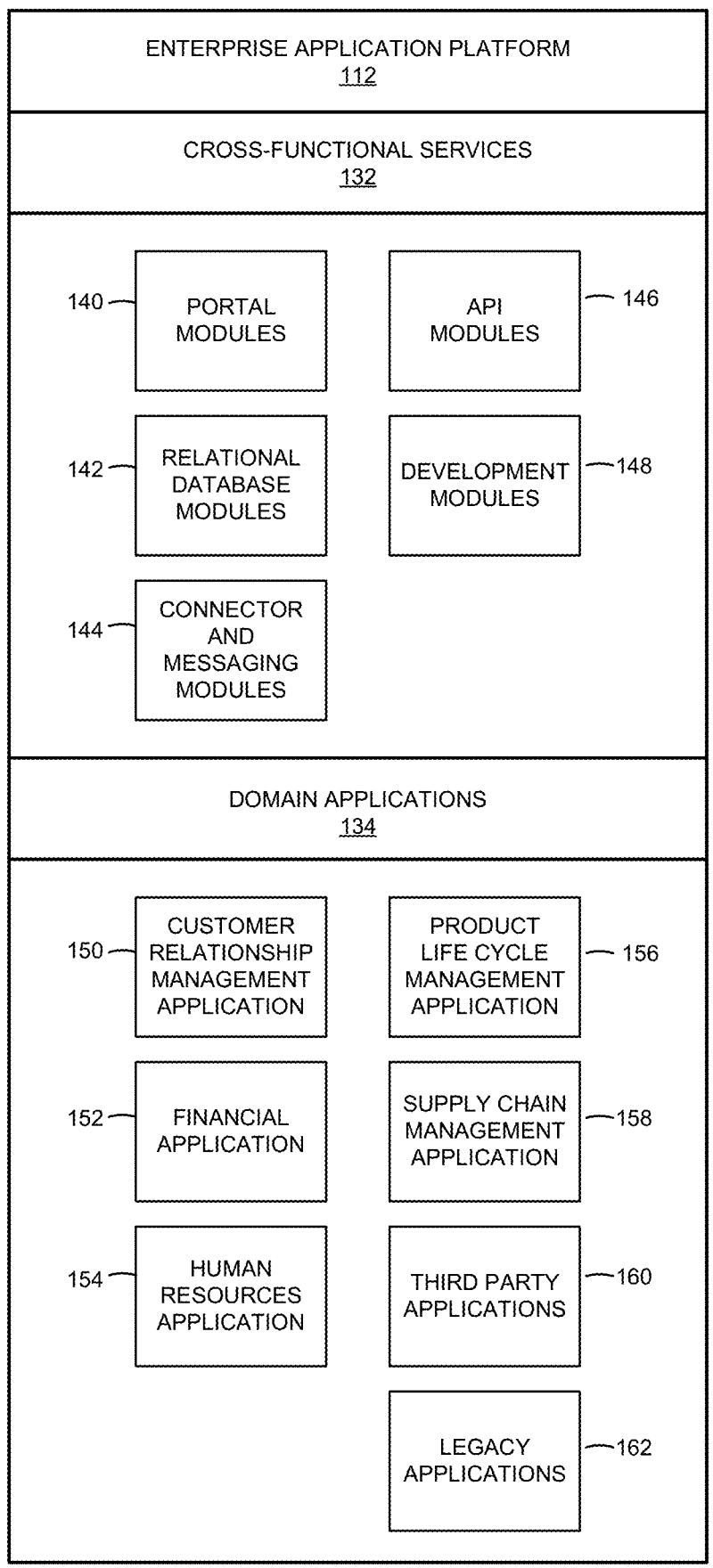
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148. The enterprise application platform 112 can be used to develop, host, and execute applications for representing and augmenting spatiotemporal patterns in analytical and decision support reporting.

The portal modules 140 can enable a single point of access to other cross-functional services 132 and domain applications 134 for the client machine 116, the small device client machine 122, and the client/server machine 117. The portal modules 140 can be utilized to process, author, and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users and within a defined scope. For example, the role can determine the content that is available to the user and the activities that the user can perform. The portal modules 140 can include a generation module, a communication module, a receiving module, and a regenerating module (not shown). In addition, the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like. In certain embodiments, the relational database modules 142 can be used to access business data stored in database(s) 130. For example, the relational database modules 142 can be used by a query engine (see, e.g., query engine 302 of FIG. 3) to query database(s) 130 for business data needed to generate spatiotemporal visualizations.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, the customer relationship management application 150 can enable access to, and can facilitate collecting and storing of, relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance. The financial applications 152 can also provide historical financial data, such as, for example, revenue and tax data, as shown in FIG. 7. Such historical data can be used to generate spatiotemporal visualizations depicting velocity of change of financial data over intervals of time.

The human resource applications 154 can be utilized by enterprise personnel and business processes to manage, deploy, and track enterprise personnel. Specifically, the human resource applications 154 can enable the analysis of human resource issues and facilitate human resource decisions based on real-time information.

The product life cycle management applications 156 can enable the management of a product throughout the life cycle of the product. For example, the product life cycle management applications 156 can enable collaborative engineering, custom product development, project management, asset management, and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

In some example embodiments, features of the present disclosure assist users during data exploration by suggesting possible next steps in the form of contextual visualizations. Visualizations can comprise graphical representations of data, such as charts, including measures and dimensions. A measure can be any property or collection of numerical values on which calculations (e.g., sum, count, average, minimum, maximum) can be made. A dimension can be a structure containing a collection of categories or labels. Spatiotemporal patterns can be represented in the visualizations.

The currently active visualization (e.g., the visualization that the user has generated and is currently viewing) can be the starting point for the spatiotemporal visualizations, with possible next steps including, for example, changing the chart type, splitting by a dimension, swapping out measures or dimensions, and so on.

Figure 3:
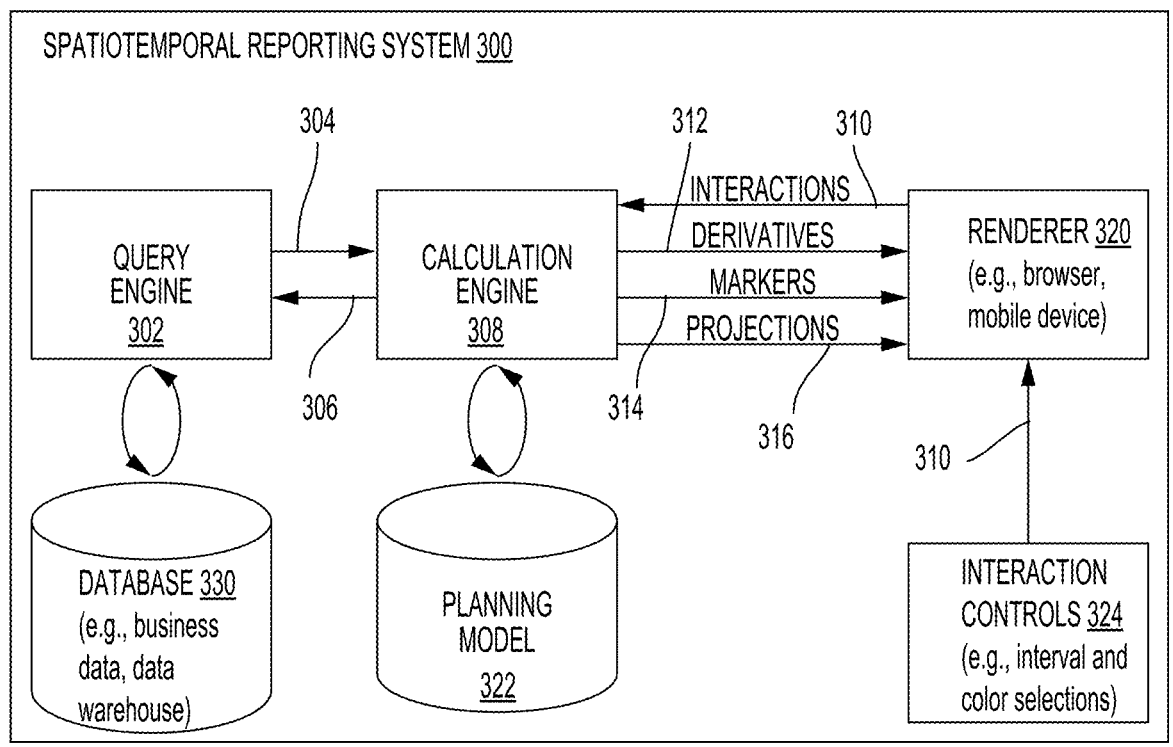
FIG. 3 is a block diagram illustrating components of a system for providing spatiotemporal visualizations, in accordance with some example embodiments.

The spatiotemporal visualizations can be presented in a side-panel and can be consumed or ignored as the user wishes. The spatiotemporal visualizations can aid the users when they are stuck and do not know where to go next in terms of data exploration (e.g., what operations or manipulations to apply to the spatiotemporal visualization), but can also be presented in a peripheral area of the user interface so that they can be easily ignored by users who already know exactly where they want to go in terms of data exploration FIG. 3 illustrates a system 300 for providing spatiotemporal visualizations, in accordance with some example embodiments. The system 300 can comprise a query engine 302, a calculation engine 308, a planning model 322, a renderer 320, interaction controls 324, and a database 330. In some example embodiments, the renderer 320 is incorporated into one of the client machines 116, 117, or 122 in FIG. 1, the query engine 302 and the calculation engine 308 are incorporated into application servers 126 in FIG. 1, and the planning model 322 and the database 330 are incorporated into database(s) 130 in FIG. 1. However, it is contemplated that other configurations are also within the scope of the present disclosure. The components of the system 300 and their functionalities are described in the following paragraphs.

As shown in the example of FIG. 3, the database 330 can include business data. Such business data can represent data gathered by a business, organization, or other entity for analytics purposes (e.g., analytics data). The data stored in database 330 can include any data needed to enable analytics. In the non-limiting example depicted in FIG. 3, the database 330 can be implemented using data warehouse capabilities. In some embodiments, database 330 can be implemented by any database server, platform, or tool with indexing capabilities designed for analytics data.

The planning model 322 is an optional component of the system 300. In some embodiments, the planning model 322 is used when forecasting and predictions of the measures are to be generated with respect to a reference dimension. In such embodiments, data from the database 330 and metadata which describes a forecasted profile is a key data structure of the planning model 322.

The query engine 302 is a database query engine configured to query the database 330. In certain embodiments, the query engine 302 is tailored to handle analytical queries efficiently and intuitively. The query engine 302 also provides an abstraction over database schemas for the database 330 and queries 306 by means of a semantic layer, which exposes underlying data such that it is easy to model the obtained query results 304 as analytical dimensions and measures.

According to an embodiment, the calculation engine 308 handles mathematical calculations for generating and updating the spatiotemporal visualizations rendered by the renderer 320. For example, the calculation engine 308 calculates derivatives 312, projections 316, and marker points (i.e., markers 314) for spatiotemporal visualizations produced by the system 300. The calculation engine 308 also performs additional calculations when a processed interaction stimulus is passed on to the calculation engine 308 from the renderer 320. In the example of FIG. 3, interactions 310 are passed to the calculation engine 308 as a result of user interaction with artifacts rendered by the renderer 320, where such artifacts include interaction controls 324 presented with a spatiotemporal visualization. Examples of functionality provided by the calculation engine 308 are described in the following paragraphs.

In some embodiments, the calculation engine 308 can utilize a variety of approaches to calculate minimum and maximum magnitude of velocity (essentially a first derivative) for a measured value. For example, the calculations of maximum magnitude of velocity can be calculated by the calculation engine 308 by estimation based on historical data against which current measurements needs to be analyzed. The calculation engine 308 can also add offsets to a maximum and minimum magnitude calculated from historical data. This can be done in order to consider corrections for the measurements under observation. For instance, if the price of crude oil drops with respect to the previous year, this may result in a reduced transportation cost profile. Such an offset can be added by the calculation engine 308 as an offset or correction to a transportation cost measurement.

As a general case of the addition of offsets, the calculation engine 308 can also create a completely new profile resulting from a planning operation. In the example system 300 of FIG. 3, the planning operation can be included in the planning model 322. The calculation engine 308 can also perform actual calculations based on the data available up until a point of observation. For example, data available from the database 330 until a point in time can be used by the calculation engine 308 to calculate minimum and maximum magnitude of velocity. Further, the calculation engine 308 can perform extrapolation based on the data available until a point of observation (e.g., a point in time).

After calculating the minimum and maximum magnitude of velocity using one of the above-described techniques, the calculation engine 308 can then define intervals in the range defined by the calculated minimum and maximum velocity. In some embodiments, the intervals are intervals of time in a range of time, such as, for example, hours, days, weeks, months, quarters, or years. In certain embodiments, there is no upper bound on the number of intervals, but intervals are chosen such that considerable data points appear or are expected to appear in the intervals. Intervals can be chosen uniformly as well when distribution is difficult to predict, or in cases where historical/planning data is not available from database 330 and planning model 322. The calculation engine 308 can use a second derivative to calculate inflection points (maxima/minima) in velocity, and these inflection points are useful in defining interval boundaries. The calculation engine 308 can perform calculations to classify intervals comprising values as normal, low, and high values. In additional or alternative embodiments, sub-bands can be formed to further sub-divide (i.e., slice and dice) the classified intervals. The calculation engine 308 can also use preset thresholds based on business requirements in order to define intervals in the range. Further, the calculation engine 308 can add offsets to the calculations obtained from historical or/and planning data. In certain embodiments, the historical data can be retrieved from the database 330 and the planning data can be retrieved from the planning model 322.

In some embodiments, the renderer 320 implements drawing (e.g., graphical) functions to enable display of spatiotemporal visualizations and other representations presented by the system 300. The actual implementation of the renderer 320 depends on the environment that an end user of the system 300 is using to access the rendered spatiotemporal visualizations. For example, as shown in FIG. 3, the renderer 320 can be implemented as a web browser or on a mobile device, depending on the platform of a client device or client machine used to display and interact with spatiotemporal visualizations. The renderer 320 takes into account the end user's device and display capabilities when rendering spatiotemporal visualizations.

In some embodiments, the interaction controls 324 include a plurality of user interface (UI) elements which can be interacted with to configure the rendering behavior of various visual artifacts, and to modify the analysis layout and underlying calculations. For instance, the interaction controls 324 can include input fields to define one or more intervals and movable markers with shape change capacity.

A user can use interaction controls 324 to provide interactions 310 in order to modify a displayed spatiotemporal visualization. As shown in FIG. 3, the interaction controls 324 can be used to provide interactions 310 for color selections for selected intervals. A user may interact with interaction controls 324 to select colors that are easily recognizable in the spatiotemporal visualizations for the intervals of interest. A user may select any arbitrary color via interaction controls 324, but selections from a gradient obtained by defining fewer colors are less distracting when rendered by renderer 320. Intervals of lesser interest can be assigned colors that are relatively similar to each other rather than a contrasting color selection, which results in implicit highlighting of the intervals of interest. Colors for intervals of interest can be selected so that they are mutually contrasting and contrast with the rest of the intervals as well.

The system 300 can also determine scales for the measures and dimensions of spatiotemporal visualizations that are generated by the calculation engine 308 and then rendered by the renderer 320. In some embodiments, a scale for the measure is normalized by showing the quantities in percentages. In alternative embodiments, the scale can be converted to absolute values, or 100% values can also be marked on the scale. The scale can convey a target value for the measure, where typically expected target values or maximum permissible values for the measure are denoted as a 100% point on the scale. Segments on the measure scale where velocity is considered lying in a certain interval may represent varying lengths in terms of a dimension scale. In this way, information can be associated with the segments, which is useful in creating projections on other measures. The system 300 can also calculate inflection points by means of second derivatives, and these inflection points can in turn be used to create projections. This case is similar to the above-described example where an interval corresponding to an inflection point is mapped to the interval of members in a dimension. Additionally, multiple points can be considered where a second derivative lies in a certain interval.

The interactions 310 provided by the user can be forwarded to the calculation engine 308, which in turn generates a query 306. After the interactions 310 corresponding to interaction controls 324 have been detected, the calculation engine 308 can submit query 306 to query engine 302, which then retrieves information from database 330 to modify the spatiotemporal visualization. In the example of FIG. 3, the information in database 330 can comprise business data stored in a data warehouse.

The query results 304 from the query engine 302 can include metric values and other data needed by calculation engine 308 to generate a spatiotemporal visualization. Spatiotemporal visualizations can comprise derivatives 312, markers 314, and projections 316, in addition to data from database 330 corresponding to a selected measure (e.g., revenue) and intervals (e.g., months) and a planning model 322 corresponding to the measure. The database 330 can return a variety of different types of data.

Query 306 is transmitted to query engine 302 to obtain data from database 330 via the query engine 302. The user can use interaction controls 324 to modify a spatiotemporal visualization of the obtained data, such as a light streak chart with color mappings for data intervals with respect to a magnitude of velocity for a measured metric. The system 300 can also comprise a control panel component to present interaction controls 324 for a displayed spatiotemporal visualization to the user concurrently with the spatiotemporal visualization. The control panel component can receive interactions 310 to request modifications to spatiotemporal visualizations from the calculation engine 308. The calculation engine 308 is configured to generate spatiotemporal visualizations and return them to the renderer 320 based on the interactions 310. The database 330 can store one or more datasets, from which data can be obtained in the generation of the spatiotemporal visualizations.

Figure 4:
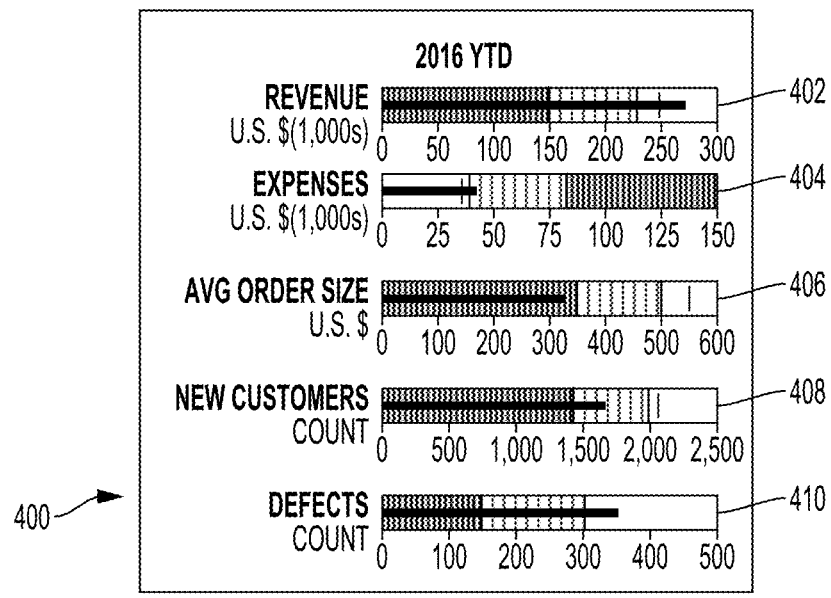
FIG. 4 illustrates an example bullet chart representation of year to date (YTD) business data.

FIG. 4 illustrates an example bullet chart 400 representation of year to date (YTD) business data. As shown, the business data includes measures 402-408 for YTD revenue, expenses, average order size, new customers, and defects. A user of such a bullet chart 400 has to create various snapshots in time in order to infer patterns for the measures that are observed over a certain period. The snapshots can also be created in order to collate the measures 402, 404, 406, 408 and 410 and in order to be able to utilize the business data in a decision making process. With the bullet chart 400, it is possible to use plots over time. However, point-in-time representations such as bullet chart 400 have certain drawbacks which make understanding and analyzing the reported data inefficient and difficult. For example, a user wishes to analyze performance of YTD data with respect to set targets for measures 402, 404, 406, 408, and 410. Usability problems of bullet chart 400 can be attributed to respective varying rates of change among the plotted measures 402, 404, 406, 408, and 410 and the inherent difficulty in observing respective rates of change when measures are plotted over time. As explained below with reference to the visualizations depicted in FIGS. 5 and 8-10, data analysis using bullet chart 400 is cumbersome and inefficient as compared to analysis performed using spatiotemporal visualizations.

Figure 5:
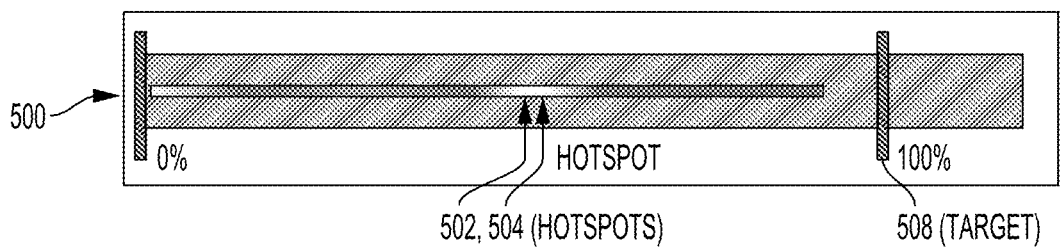
FIG. 5 illustrates a light streak visualization representing a measured quantity, in accordance with some example embodiments.

FIG. 5 illustrates a light streak visualization 500 representing a measured quantity. As compared to bullet chart 400 of FIG. 4, the light streak visualization 500 provides an improved and more intuitive experience. This is because the light streak visualization 500 is tuned to how a human user observes performance of a moving real-world entity that is expected to reach certain target (e.g., target 508). The light streak visualization 500 is an example representation of hotspots 502 and 504 as a measured value approaches target 508.

The light streak visualization 500 is analogous to a representation of a long exposure photograph of a car with headlights moving from point A to point B in darkness, where the photograph is captured from a distance such that the car's starting point as well as the target 508 is in the photograph's frame, and the starting and target points are reasonably separated from each other. Such a representation results in a light streak which gets captured on the photograph. By using such a representation, it is easy to for a user to visualize the actual pattern of movement for a measure by simply observing the intensity of the light at various points in the captured light streak. For example, using the car analogy, the user can infer, if there is a bright spot (e.g., between hotspots 502 and 504), that the car is at rest at that point (i.e., the velocity is stable). The user can also infer, if the brightness of a hotspot 504 starts decreasing, that the car started speeding up (i.e., the velocity is increasing). Similarly, the user can infer, if the brightness of a hotspot 502 starts increasing, that the car started slowing down or decelerating (i.e., the velocity is decreasing).

If we take a measured quantity like the measures 402, 404, 406, 408, and 410 of bullet chart 400 of FIG. 4 and plot them such that brightness of the respective bands is inversely related to the rate of change of the quantity, then the plot may look similar to the example as shown in FIG. 5. In this way, the light streak visualization 500 can preserve information associated with the bullet chart 400, while also capturing and highlighting the interval where a given quantity was increasing very slowly (e.g., hotspot 502), which may be of interest to an analyst user.

The system 300 and methods disclosed herein (see, e.g., method 1300 illustrated in FIG. 13) incorporate and augment spatiotemporal patterns in visualizations such as those presented in FIGS. 5 and 8-10. In these example visualizations, the dimension against which a rate of change of a measured quantity is calculated is defined such that its domain can be represented mathematically by a monotonic function. An example of such a dimension is time, which is ubiquitous in business reports and decision support systems. The example light streak visualizations represent cases where the measured quantity is also a monotonic function (e.g., increasing or decreasing) with respect to the chosen dimension (e.g., time). It is assumed that measures can only have a single value against a member (point) in the dimension. In order to generate light streak patterns such as the examples provided in FIGS. 5 and 8-10, the value of the rate of change (first derivative) is used to calculate a color value of the plotted measure.

As used herein, the term 'velocity' generally refers to a 'rate of change' which describes motion of a measure towards a target or goal. For example, a revenue velocity can represent an acceleration or deceleration of a measured revenue value (e.g., dollars of revenue during an interval) as revenue accumulates towards a revenue target value (e.g., total dollars of revenue).

Figure 6:
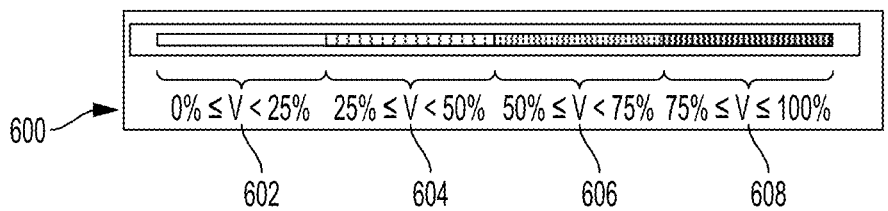
FIG. 6 illustrates a mapping of velocity intervals on a brightness or color scale, in accordance with some example embodiments.

FIG. 6 illustrates a mapping 600 of velocity intervals on a color (or brightness) scale. As shown, a color 602 is defined to denote a minimum possible magnitude of velocity, and another color 608 is defined to denote maximum possible magnitude of the velocity. In some embodiments, the maximum possible magnitude of the velocity is precalculated. Additionally, other colors 604 and 606 are chosen such that they relatively contrast with colors 602 and 608 in order to assist with visual perception of changes in velocity in spatiotemporal visualizations. In mapping 600, the closed interval represented by minimum and maximum magnitude of velocity is subdivided, and every such interval is a candidate for a unique color assignment. That is, different colors can be assigned or selected for sub-intervals of the interval represented by the zero percent minimum and one hundred percent maximum magnitude of velocity. In the example of FIG. 6, unique colors 602, 604, 606, and 608 are assigned to the sub-intervals, and then mapped from a gradient generated using the contrasting colors. The color mapping 600 for the intervals with respect to the velocity scale is monotonic on a color scale.

In the mapping 600, the colors 602, 604, 606, and 608 for the intervals are selected such that they are easily recognizable in a spatiotemporal visualization for intervals of interest. In some embodiments, any arbitrary color may be selected, but selections from a gradient obtained by defining fewer colors will be less distracting when the spatiotemporal visualization is rendered. In mapping 600, intervals of lesser interest can be assigned colors in relative vicinity rather than a contrasting selection. This results in implicit highlighting of the intervals of interest. Colors for intervals of interest can be automatically selected or user-selected so that they are mutually contrasting and contrast with the rest of the intervals.

FIG. 7 depicts historical data 700 that example visualization reports can be based upon. As shown, historical data 700 includes measures 704-712 for monthly intervals 702. The measures 704-712 can include historical values for revenue, logistics, operations, raw materials, and taxes. FIG. 7 illustrates a table of historical data 700. In the example embodiment of FIG. 7, the leftmost column comprises the intervals 702 that can be depicted in a spatiotemporal visualization, while the other columns comprise the possible measures (704-712) that can be depicted in the spatiotemporal visualizations presented to the user. It is noted that, for the purposes of simplicity and fitting within the confines of the page, the historical data 700 in FIG. 7 shows only ten intervals (e.g., the months of January-October) and five different measures (e.g., revenue 704, logistics 706, operations 708, raw materials 710, and taxes 712) for spatiotemporal visualizations. It is contemplated that many other measures and intervals are also within the scope of the present disclosure.

Looking at a situation where the spatiotemporal visualization is a light streak chart, the table of historical data 700 shows that light streak charts can be generated that depict change in velocities for different measured values, in this case: measures 704-712 for revenue, logistics, operations, raw materials, and taxes. Within each type of measure 704-712, the number of different intervals 702 that can be plotted can be based on user selection of interaction controls corresponding to months. As one example depicted in FIG. 8, a spatiotemporal visualization 800, in the form here of a light streak chart, can convey the velocity of revenue change in selected monthly intervals, thereby depicting the relative velocity of revenue change (increase or decrease) in months that are of interest to the user. It is contemplated that the measures 704-712 and intervals 702 in the historical data 700, and selections of the measures 704-712 and intervals 702, are only shown as an example, and that other measures, intervals, and interaction controls are within the scope of the present disclosure.

FIG. 8 illustrates a spatiotemporal visualization 800 representing a light streak chart showing intervals of interest for revenue with respect to a revenue target 808. As shown, the spatiotemporal visualization 800 displays revenue data as a light streak chart. In particular, FIG. 8 depicts an example light streak chart generated using the revenue data (i.e., measure 704) shown in FIG. 7. In the example of FIG. 8, the temporal segments 802, 804, and 806 corresponding to the intervals of May, July, and September, respectively, are not of equal widths. The wider width of segment 806 indicates that the revenue in September was greater than revenue in May and July.

The spatiotemporal visualization 800 can be displayed in a first dedicated section (e.g., a main panel) of a user interface that is dedicated to spatiotemporal visualizations, and the spatiotemporal visualization 800 can be displayed in a second dedicated section (e.g., a side panel) of the user interface that is dedicated to spatiotemporal visualizations. Additionally, as described below with reference to FIGS. 9 and 10, the hotspots at segments 802 and 804 revealed by the spatiotemporal visualization 800 can be augmented by temporal markers, and the marked regions can be projected from one measured quantity to other measures so as to extend the augmentation context.

The spatiotemporal visualization 800 can be a graphical representation of at least a portion of data of a dataset. The dataset can comprise a plurality of measures and a plurality of dimensions, and the data of the spatiotemporal visualization 800 can comprise at least one measure (e.g., revenue in FIG. 8) from the plurality of measures of the dataset and at least one dimension (e.g., percentage with respect to target 808 in FIG. 8) of the plurality of dimensions of the dataset. As previously mentioned, a measure can be any property on which calculations can be made (e.g., numeric values), and a dimension can be a structure that categorizes or labels measures. While the example of FIG. 8 is a light streak chart, the spatiotemporal visualization 800 can also be embodied as a bar chart, a group bar chart, a stacked bar chart, a dual bar chart, a scatter plot, a pie chart, and a donut chart. Other types of charts and visualizations, such as, for example, brick charts and donut charts, are also within the scope of the present disclosure.

Figure 10:
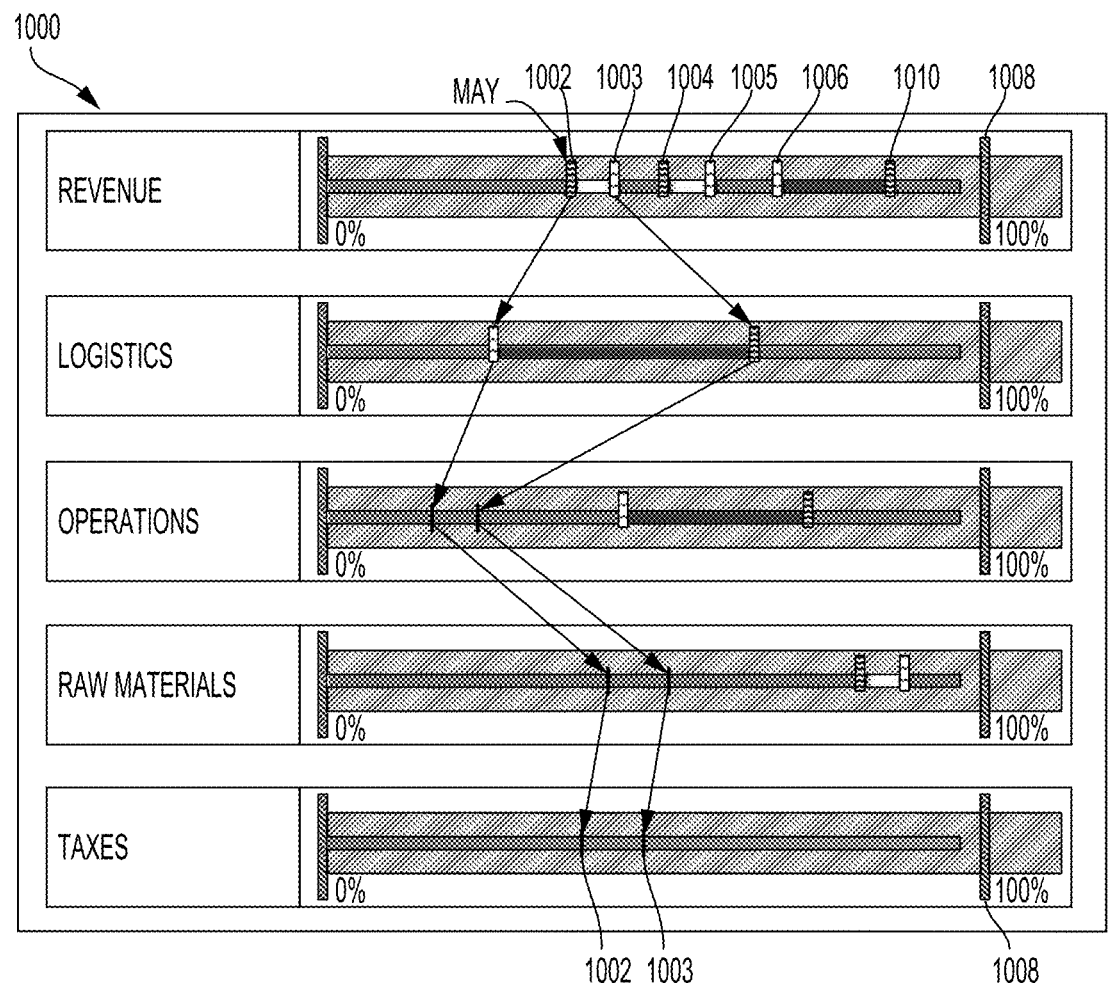
FIG. 10 depicts light streak visualizations representing augmentations of measured values with projections from points of interests, in accordance with some example embodiments.

In the example embodiment of FIG. 8, the spatiotemporal visualization 800 comprises a light streak chart plotting revenue across time intervals (e.g., months of a year) in terms of a percentage of target 808, and there are three segments 802, 804, 806 being displayed with light streaks representing respective changes in revenue velocity changes for the corresponding intervals (e.g., months). A variety of spatiotemporal visualizations can be generated within the context of the same data set. For example, a user can make selections for spatiotemporal visualization options via interaction controls presented in a user interface (UI). In some embodiments, a plurality of interactive UI elements can be interacted with to configure the rendering behavior of various visual artifacts, and to modify the analysis layout and underlying calculations. For instance, UI elements for input fields can be selected by a user to define an interval (e.g., week, month, quarter, year), and movable markers with a shape change capacity and colors for inflection points can also be selected. FIGS. 9 and 10, which are described below, show changes to spatiotemporal visualizations that can be made as a result of user interactions received via a UI.

FIG. 9 is the light streak chart of FIG. 8 with inflection points added to produce spatiotemporal visualization 900. In particular, FIG. 9 depicts the result of taking the light streak revenue chart and adding inflection points 902, 903, 904, 905, 906, and 910 for the May, July, and September segments 802, 804, and 806 of spatiotemporal visualization 800.

In the example of FIG. 9, the spatiotemporal visualization 900 includes inflection points obtained by a second derivative in time, such that positive changes in velocity are marked by colored bars at inflection points 903, 905, and 906. In one embodiment, the color for these acceleration bars is green. Similarly, negative changes in velocity (i.e., deceleration) are marked by colored bars at inflection points 902, 904, and 910. In an embodiment, the color for these deceleration bars is red. In the example of FIG. 9, the start of May and July and the end of September have negative changes in velocity (i.e., decreasing revenue), while the start of June, August and September have positive change in velocity (i.e., increasing revenue). In certain embodiments, a band representing an inflection point may be defined as an interval as well, rather than being a point in time. For example, an inflection point can be an interval of values in a measure, where the rate of change of the first derivative is within a predefined range.

FIG. 10 depicts a plurality of spatiotemporal visualizations 1000 comprising light streak charts representing augmentations of measured values with projections from points of interest 1002 and 1003. In the plurality of spatiotemporal visualizations 1000, the first and second derivatives with respect to the chosen dimension reveal relevant intervals and points of interest. FIG. 10 shows ways to incorporate this information without actually changing the outline and features of the basic visualization type. In particular, FIG. 10 shows that information so obtained can be used to further augment other measures by creating projections from the intervals/points of interest chosen from a reference measure (e.g., revenue in the example of FIG. 10). In some embodiments, moveable, temporal markers corresponding to points of interest can be placed within a measure in a spatiotemporal visualization. For example, as a result of user interaction with selectable interaction controls, temporal markers corresponding to inflection points for a reference measure (e.g., points of interest 1002 and 1003 in the revenue measure) can be placed, and projections from the inflection points to other measures (e.g., logistics, operations, raw materials, and taxes) can be plotted in the spatiotemporal visualization. In additional or alternative embodiments, initial locations for moveable, temporal markers can be determined. For instance, an initial location for a pair of moveable markers corresponding to inflection points (e.g., points of interest 1002 and 1003) can be automatically determined by calculating a first velocity hotspot in a reference measure (e.g., revenue).

The plurality of spatiotemporal visualizations 1000 of FIG. 10 include a light streak chart plotting points of interest 1002, 1003, 1004, 1005, 1006, and 1010 in terms of a revenue target 1008. As shown in FIG. 10, the plurality of spatiotemporal visualizations 1000 also plot inflection points of interest 1002 and 1003 with respect to measures for logistics, operations, raw materials, and taxes.

In the example presented in FIG. 10, the data as given in FIG. 7 is used to create a visualization with the projections from points of interest 1002 and 1003 in the revenue measure. The vertically downward flow of arrows originating at the reference revenue measure represent a boundary in time which cuts through other measures (e.g., logistics, operations, raw materials, and taxes). The segment of a measure between two inbound or outward arrows consists of an interval defined by the values of the measure at two points of interest 1002 and 1003, which are marked by the arrows.

By using the augmented representation shown in FIG. 10, an analyst or other user can readily draw the following conclusions. First, there is a visually strong correlation of a first pair of inflection points (e.g., points of interest 1002 and 1003), which delineates a first velocity hotspot in revenue, to the inflection points in logistics (e.g., points of interest in logistics corresponding to projections from points of interest 1002 and 1003). Second, the slowing down of revenue in the month of May can be attributed mostly to the increasing cost of logistics. Also, major logistics costs were incurred in the month of May. Since there are no further inflections in logistics after May, revenue inflections observed later than the May interval (e.g., points of interest 1004, 1005, 1006, and 1010) might be related to other drivers. If those measures were not in the perspective in the first place, then the analyst would be likely to include more drivers to find if revenue is correlated to other measures (i.e., besides logistics, operations, raw materials, and taxes). Additionally, FIG. 10 shows that the rest of the measures were not going through unfamiliar changes in May. Further, although considerable logistics costs were incurred in May, considerable revenue was still generated. Based on the analysis of historical data, if it turns out that increased logistics cost is a periodic phenomenon in May, it can be omitted/masked from the analysis permanently. In principle, the analyst will be able to readily recognize that logistics has ceased to be a point of interest. While revenue was selected as the reference measure in the non-limiting example of FIG. 10, it is to be understood that various additional projections can be generated from other chosen reference measures.

In some example embodiments, UI elements displayed in a UI including the spatiotemporal visualizations 800, 900, and 1000 are selectable interaction controls (e.g., interaction controls 324). In this respect, a user can interact with one of the UI elements to make changes to spatiotemporal visualizations. For example, with reference to FIGS. 3, 8, and 9, interaction controls 324 can be selected to provide interactions 310 to modify spatiotemporal visualization 800 and generate spatiotemporal visualization 900. In this example, a graphical representation corresponding to an interaction control 324 to add inflection points can be displayed, the selected change is made to spatiotemporal visualization 800 and an updated spatiotemporal visualization 900 with added inflection points 902, 903, 904, 905, 906, and 910 is then displayed in the user interface. By selecting interaction controls 324, updated spatiotemporal visualizations can then be generated based on interactions 310 and displayed to the user.

Figure 11:
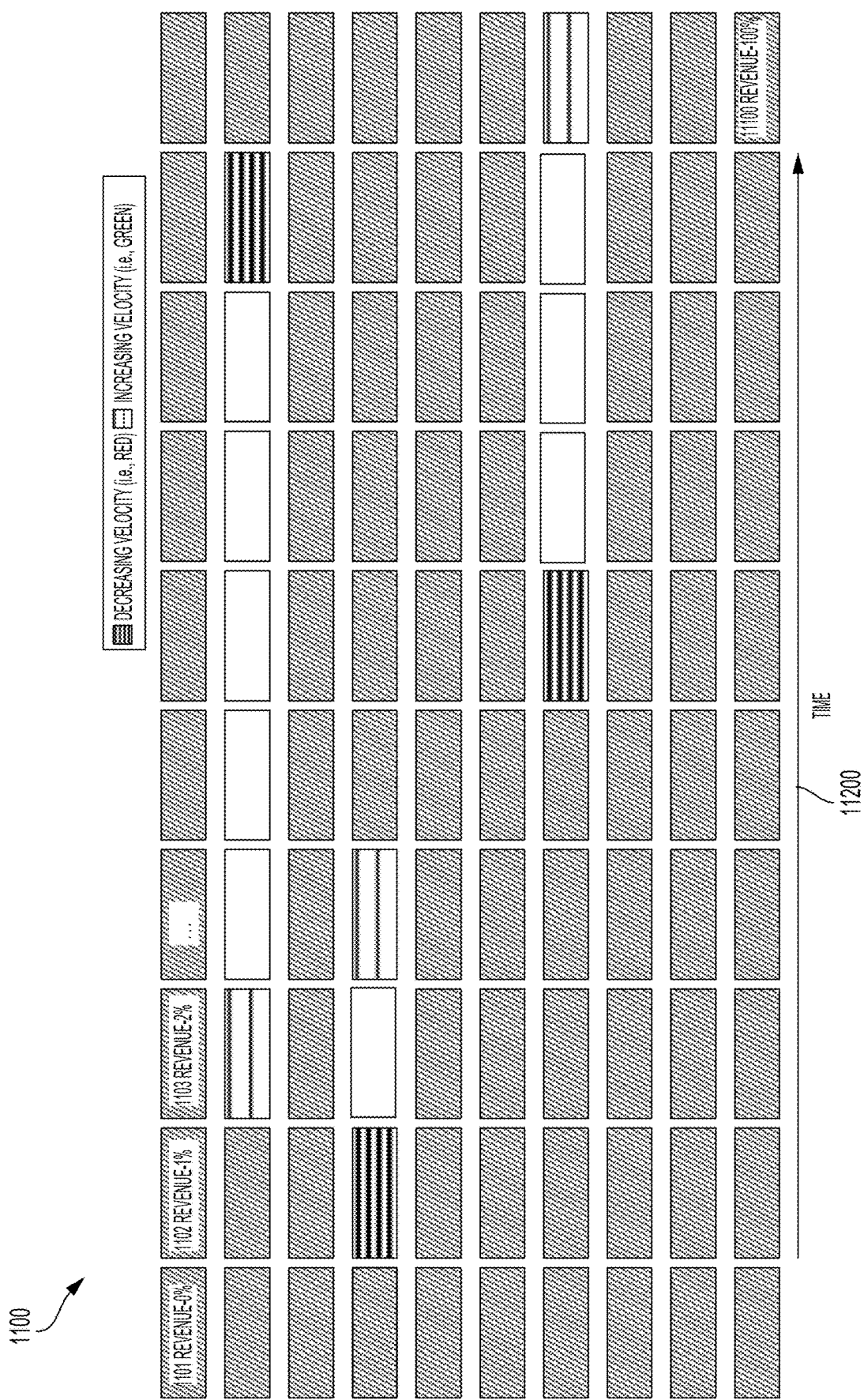
FIG. 11 depicts a brick chart visualization representing accumulated percentages of measured values with inflection points, in accordance with some example embodiments.
Figure 12:
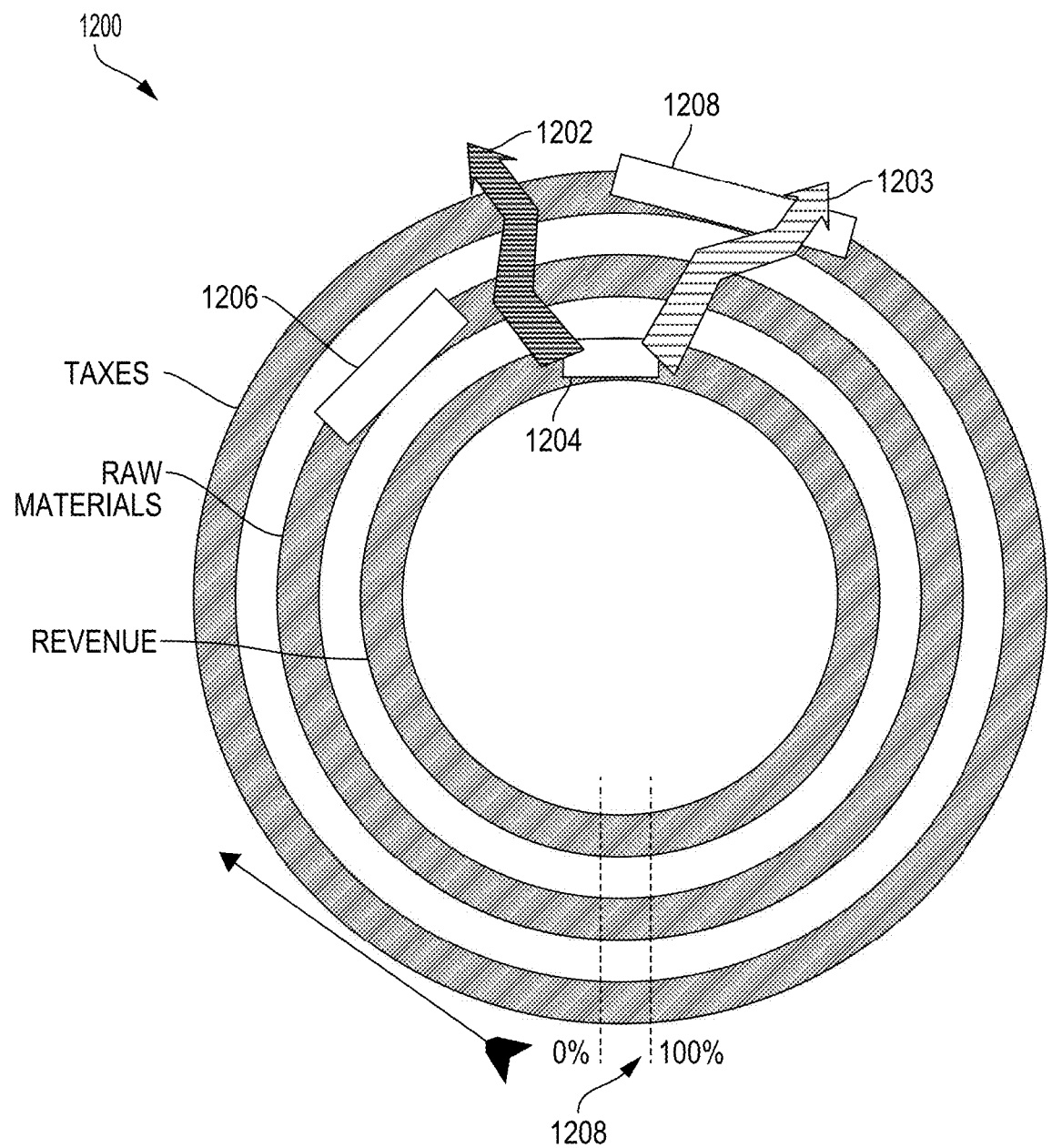
FIG. 12 depicts a donut chart visualization with projections from a measured value to related measured values, in accordance with some example embodiments.

The approaches described above with reference to FIGS. 3 and 5-10 are extensible to various other types of visualizations as well, and is not limited to the example light streak representations. FIGS. 11 and 12 depict additional types of visualizations.

For example, FIG. 11 depicts a brick chart visualization 1100 representing accumulated percentages of measured values with inflection points. In brick chart 1100, each brick 1101-11100 represents one percent of a total value accumulated so far (relative to time 11200), for a given measure (e.g., revenue in the example of FIG. 11). The brick chart visualization 1100 enables analysis of the measure over time 11200 by breaking-up the performance of the measure into manageable, granular units (e.g., individual percentages). As seen in FIG. 11, inflection areas and relevant acceleration (revenue speedups) and deceleration (revenue slowdowns) can be color coded similar to the bullet chart 400 of FIG. 4. In an embodiment, brick chart visualization 1100 is rendered in a user interface in response to a user selecting a particular measure (e.g., revenue) and selecting to transition from another representation. For example, a user may select to display a brick chart for revenue while interacting with the revenue measure 402 displayed in bullet chart 400.

In some embodiments, the user can further drill down by selecting a subset of bricks 1101-11100, which results in other measures being displayed for the range of time 11200 corresponding to the subset. These other measures can in turn be represented with other charts, such as, for example a bullet chart, a light streak chart, or a new brick chart. As shown, the bricks 1101-11100 can also contain relevant text (e.g., the measure and its accumulated amount or percentage relative to a target or goal). In additional or alternative embodiments, text in the bricks 1101-11100 can convey other data such as, for example, a rate of progression towards a goal or a relative velocity of the measure.

Further, for example, FIG. 12 depicts a donut chart visualization 1200 with projections from a measured value to related measured values. In particular, the donut chart visualization 1200 includes concentric bands or donuts to represent related measures, with the innermost band is representing the affected key measure, or the measure under observation (e.g., revenue in the example of FIG. 12). FIG. 12 shows, projections 1202 and 1203 from the key measure to other measures (e.g., raw materials and taxes) along with inflection points 1204, 1206, and 1208 in the respective bands so as to visually identify any correlations between the measures as the key measure progresses towards target 1208. In the example of FIG. 12, an inflection point 1204 in the outermost band corresponding to taxes is shown to have some relevance and might have affected the performance as observed in the key measure (e.g., revenue). The projections 1202 and 1203 can originate from any band, in the non-limiting example of FIG. 12, they originate from the innermost band.

The concept of using derivatives in conjunction with the derived projections on various measures is shown in FIGS. 5 and 8-12 to reveal deeper insights, which enables visually intuitive reporting and efficient decision making. Additional artifacts associated with the visualizations are described below.

The light streak patterns, brick chart, and donut chart shown in FIGS. 5 and 8-12 are specific manifestations of dividing measures into definite intervals and color coding the intervals. In additional or alternative embodiments, any arbitrary number of intervals and color coding can be chosen. In additional or alternative embodiments, any level of derivatives can be used to identify the inflection points and intervals of interest. The inflection points obtained by the derivatives can be defined as intervals if needed. For example, values falling in certain interval created about the inflection can be considered. Also, for example, an interval can be obtained by adding offsets to local maximums and/or minimums. Further, for example, intervals can be defined in terms of percentage values of local maximums/minimums.

Projections are meant to provide visual cues. In additional or alternative embodiments, projections can be drawn from any type of interval or inflection point, irrespective of the fact that an interval/point may be derived from an Nth derivative. In additional or alternative embodiments, any type of scale can be used for the analysis, and the spatiotemporal visualizations are not restricted to percentage scale or the absolute values. For example, even non-linear scales like logarithmic scales can be used when a range of measures is very large.

In some embodiments, to make the analysis more succinct, well understood or spurious variations can be masked or omitted completely, which results in either ignoring the projections or in there being no identifiable correlation, respectively.

Although the representations of FIGS. 5 and 8-12 appear to be static, in embodiments, markers can be generated automatically for the intervals. In these embodiments, the markers are based on the chosen interval, and the projections can be launched on other measures at analysis time. These embodiments enable an analyst to navigate various intervals and inflection points quickly.

While light streak visualizations are depicted in the examples of FIGS. 5 and 8-10, it is to be understood that any shape can be used to represent/replace the bands of the measures, intervals, or other visual attributes. For example, as shown in FIG. 12, a donut chart visualization can be used as the basis for representation. Also, by using the systems and methods described herein, analysis can be performed on the magnitude of measures. For example, even real values can be represented on a similar (either negative or positive) number line. With conventional techniques, having such bipolar representation may result in projections which are highly skewed and eventually useless. The observation set can be chosen by taking only certain members in the dimension and then defining a domain to start with. In contrast, in the systems and methods described herein, rather than finding the dimension members of interest in a given range of a measure, an analyst can start with a set of dimension members, thereby controlling the scope of analysis and limiting it to desired members in dimension.

In some embodiments, it is not necessary to use the actual measures in analysis. For instance, a predicted or forecasted profile may typically be generated by a planning exercise. In such a scenario, embodiments enable a user to see how close a plan was with respect to actual performance. The embodiments described herein are agnostic to the origin of a measure, thus extensible to such planning and forecasting scenarios.

Figure 13:
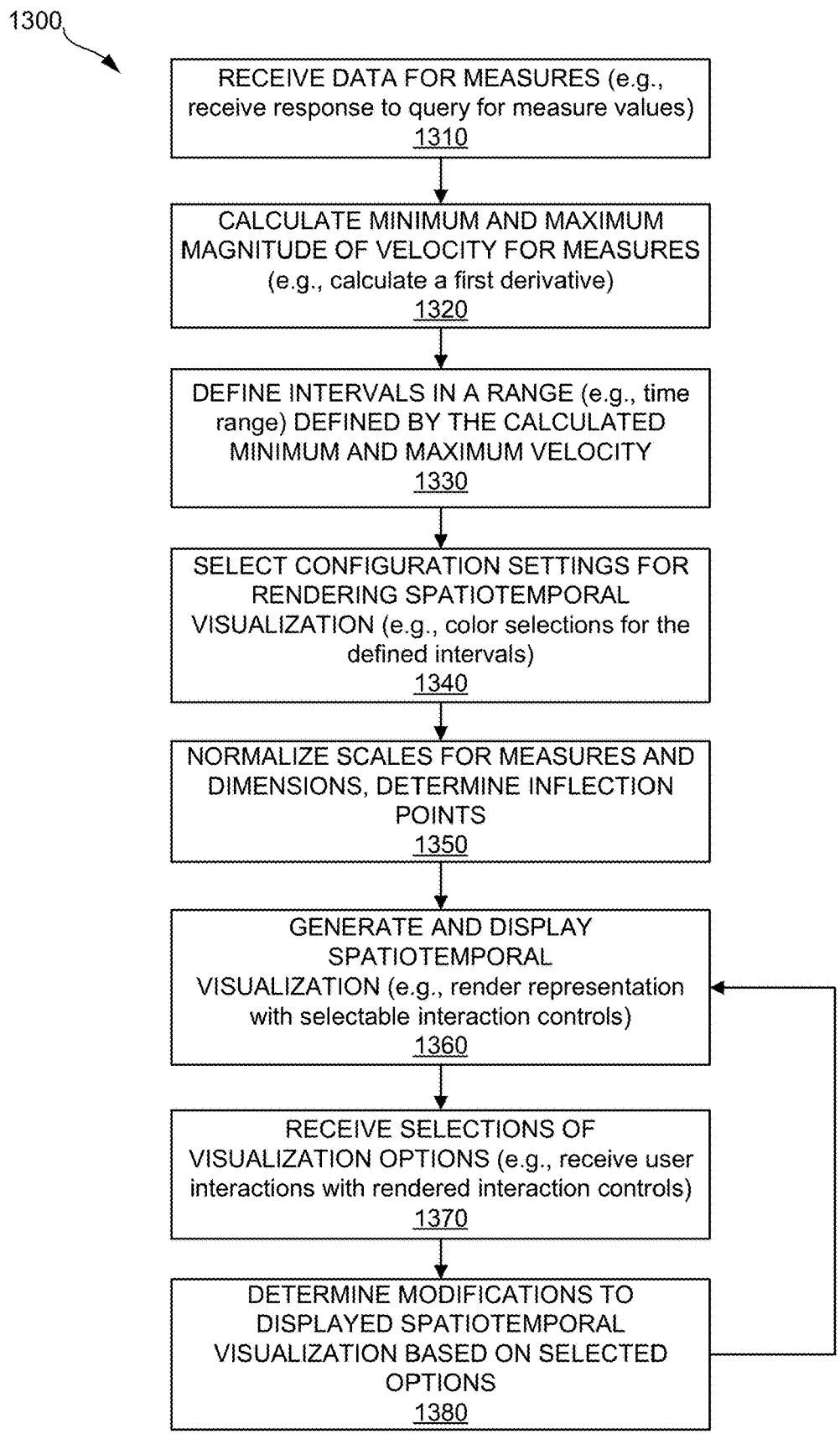
FIG. 13 is a flowchart illustrating a method of providing spatiotemporal visualizations, in accordance with some example embodiments.

FIG. 13 is a flowchart illustrating a method 1300 of providing spatiotemporal visualizations, in accordance with some example embodiments. Method 1300 can be performed by processing logic that can comprise hardware (e.g., circuitry, dedicated logic, programmable logic, microcode, etc.), software (e.g., instructions run on a processing device), or a combination thereof In one example embodiment, the method 1300 is performed by the system 300 of FIG. 3 or any combination of one or more of its respective components or modules, as described above.

At operation 1310, data for measures can be received. In the example of FIG. 13, operation 1310 can include receiving a dataset in response to a query for measure values. The dataset can comprise a plurality of measures and a plurality of dimensions. By performing operations 1320-1380, a spatiotemporal visualization comprising a graphical representation of the at least a portion of data can be generated and modified. The at least a portion of data can comprise at least one of the plurality of measures and at least one of the plurality of dimensions.

At operation 1320, a minimum and maximum magnitude of velocity for measures can be calculated. In the example of FIG. 13, operation 1320 can include calculating a first derivative.

At operation 1330, intervals in a range defined by the calculated minimum and maximum velocity can be defined. In the example of FIG. 13, operation 1330 can include defining intervals in a time range, such as months in a year.

At operation 1340, configuration settings for rendering spatiotemporal visualization are selected. In the example of FIG. 13, operation 1340 can include selecting colors for the defined intervals. At operation 1350, scales for the measures are normalized and inflection points are determined.

At operation 1360, a spatiotemporal visualization can be generated and displayed. In the example of FIG. 13, operation 1360 can include rendering a representation with selectable interaction controls. At operation 1370, a user selection of one of the plurality of selectable interaction controls can be detected, and selections of visualization options can be received. In the example of FIG. 13, operation 1370 can include detecting and receiving user interactions with rendered interaction controls.

At operation 1380, modifications to the displayed spatiotemporal visualization based on selected options can be determined before control is passed back to operation 1360 in order to generate and display the modifications to the spatiotemporal visualization. It is contemplated that any of the other features described within the present disclosure can be incorporated into method 1300.

The method 1300 enables an analyst to more readily understand the performance of a measure with respect to a reference dimension as compared to techniques using traditional analytical reports. The method 1300 allows the analyst to compare actual performance against a forecasted model. Further, the method 1300 using spatiotemporal visualizations enables comparisons of actual performance with a plan or forecast, while also increasing the efficiency and intuitiveness of the workflows in a decision support system.

The spatiotemporal visualizations described herein benefits when compared to traditional approaches of plotting a measure (e.g., a KPI representation in a static bullet chart in a point in time) in an analytical report. For instance, by using the spatiotemporal visualizations described herein, variations corresponding to a progression are available in the same representation, which enables the user to quickly understand the dynamic behavior of measures. Also, relatively less context switching is needed when carrying out quantitative evaluation of the dynamic behavior as compared to traditional approaches where several snapshots of the measures are needed at different points in the dimension to infer changes and related patterns.

Additionally, with the spatiotemporal visualizations described herein, inflection points assist in identifying the logically significant hotspots, thus effectively helping in quickly identifying an interval of interest. This is also useful when defining such segments in terms of the range of a measure, or as the set of the dimension members. Also, projections provide spontaneous visual cues about any correlation existing among the plotted measures, which makes it easier to comprehend the influencing drivers or the affected measures. Embodiments also enable easy evaluation of performance against a forecasted model; in addition, the deviations can be studied efficiently with the help of projections.

In some embodiments, patterns similar to the light streak can be used, which is more intuitive for humans because of the similarity with motion of real-world objects.

The spatiotemporal visualizations described herein help answer relevant questions, like 'How have certain changes happened?', 'Why did they happen?', 'What could possibly happen?', that are not easily answered when using existing representations, which are typically limited to providing information only about 'What happened?'

As compared to conventional 'value driver trees,' which are also used to understand the influence of drivers, the spatiotemporal visualizations described herein additionally capture behavior over the set of dimension members. Practically, it is more likely that drivers may not be behaving uniformly in the given domain; therefore projections better convey indications about the progression of affected quantities.

The contextual information gathered while creating a first spatiotemporal visualization (e.g., a light streak chart) can be used to generate other various types of representations (e.g., a donut chart) based on the analysis required. The first level of filtering is already done by the time the first spatiotemporal visualization is generated, and points of interest are readily available. This effectively creates a visualization of desired type based on the projections obtained earlier.

Compared to traditional approaches, the spatiotemporal visualizations described herein provide a relatively greater degree of interaction to analysts, and beneficial inferences can be drawn without switching the representation type. That is, users of the disclosed systems and methods can perform analysis by choosing multiple projections across different measures at the same time.

EXAMPLES

Embodiments and methods described herein further relate to any one or more of the following paragraphs. As used below, any reference to a series of examples is to be understood as a reference to each of those examples disjunctively (e.g., "Examples 1-4" is to be understood as "Examples 1, 2, 3, or 4").

Example 1 is a system that includes one or more hardware processors and a computer-readable medium coupled with the one or more hardware processors. The computer-readable medium comprises instructions executable by the processor to cause the system to perform operations. The operations include receiving at least a portion of data of a dataset, the dataset comprising a plurality of measures and a plurality of dimensions. The operations also include calculating a minimum and maximum magnitude of velocity for measures in the at least a portion of data of the dataset. The operations further include defining intervals in a range defined by the calculated minimum and maximum velocity, and selecting configuration settings for rendering a spatiotemporal visualization corresponding to the at least a portion of data of the dataset and the defined intervals. The operations also comprise generating the spatiotemporal visualization to be displayed to a user in a graphical user interface of a device, the spatiotemporal visualization comprising a graphical representation of the at least a portion of data, the at least a portion of data comprising at least one of the plurality of measures and at least one of the plurality of dimensions over the defined intervals. The operations further comprise causing display, in the graphical user interface of the device, of the spatiotemporal visualization and a plurality of selectable interaction controls corresponding to the spatiotemporal visualization.

Example 2 is the system of Example 1, where the plurality of selectable interaction controls comprise controls for modifying the spatiotemporal visualization based on selecting one or more of: an interval of the defined intervals; a measure of the plurality of measures; a movable marker for an inflection point of velocity for the at least one of the plurality of measures; a reference dimension of the plurality of dimensions; and a chart type of the spatiotemporal visualization.

Example 3 is the system of Examples 1 or 2, where the operations further include causing display, in the graphical user interface of the device, the plurality of selectable interaction controls concurrently with the spatiotemporal visualization, the spatiotemporal visualization being caused to be displayed in a first dedicated section of the graphical user interface for spatiotemporal visualizations, the plurality of selectable interaction controls being caused to be displayed in a second dedicated section of the graphical user interface.

Example 4 is the system of Examples 1-3, where the operations further comprise: detecting user interaction with one or more of the plurality of selectable interaction controls; providing one or more selections corresponding to the detected user interaction with the one or more of the selectable interaction controls to the calculation engine; re-generating the spatiotemporal visualization based on the one or more selections; and causing display, in the graphical user interface, the re-generated spatiotemporal visualization in the first dedicated section of the graphical user interface for spatiotemporal visualizations.

Example 5 is the system of Examples 1-4, where the plurality of measures comprises numeric values corresponding to performance metrics.

Example 6 is the system of Examples 1-5, where the plurality of dimensions comprise a target value for the at least one of the plurality of measures.

Example 7 is the system of Examples 1-6, where the intervals in the range comprise time intervals corresponding to one or more of hours, days, weeks, months, quarters, and years.

Example 8 is the system of Examples 1-7, where the spatiotemporal visualization comprises a light streak chart.

Example 9 is the system of Examples 1-8, where the spatiotemporal visualization comprises a brick chart.

Example 10 is the system of Examples 1-9, where the spatiotemporal visualization comprises a donut chart.

Example 11 is the system of Examples 1-10, where the system further comprises: a calculation engine configured to perform the receiving, the calculating, the defining, the selecting, and the generating; and a renderer configured to perform the causing display of the spatiotemporal visualization and the plurality of selectable interaction controls.

Example 12 is a computer-implemented method that includes receiving at least a portion of data of a dataset, the dataset comprising a plurality of measures and a plurality of dimensions. The method calculates a minimum and maximum magnitude of velocity for measures in the at least a portion of data of the dataset. The method also includes defining intervals in a range defined by the calculated minimum and maximum velocity, and selecting configuration settings for rendering a spatiotemporal visualization corresponding to the at least a portion of data of the dataset and the defined intervals. The method further includes generating the spatiotemporal visualization to be displayed to a user in a graphical user interface of a device, the spatiotemporal visualization comprising a graphical representation of the at least a portion of data, the at least a portion of data comprising at least one of the plurality of measures and at least one of the plurality of dimensions over the defined intervals. The method also includes causing display, in the graphical user interface of the device, of the spatiotemporal visualization and a plurality of selectable interaction controls corresponding to the spatiotemporal visualization.

Example 13 is the method of Example 12, where the spatiotemporal visualization comprises a light streak chart.

Example 14 is the method of Examples 12 or 13, where the method further includes causing display, in the graphical user interface of the device, the plurality of selectable interaction controls concurrently with the spatiotemporal visualization, the spatiotemporal visualization being caused to be displayed in a first dedicated section of the graphical user interface for spatiotemporal visualizations, the plurality of selectable interaction controls being caused to be displayed in a second dedicated section of the graphical user interface.

Example 15 is the method of Examples 12-14, where the method further includes detecting user interaction with one or more of the plurality of selectable interaction controls; determining one or more selections corresponding to the detected user interaction with the one or more of the selectable interaction controls; modifying the spatiotemporal visualization based on the one or more selections; and causing display, in the graphical user interface, the modified spatiotemporal visualization in the first dedicated section of the graphical user interface for spatiotemporal visualizations.

Example 16 is the method of Examples 12-15, where: the one or more selections include selection of temporal markers corresponding to inflection points for the at least one of the plurality of measures; and the modifying comprises augmenting the spatiotemporal visualization to include projections from the inflection points to another one of the plurality of measures.

Example 17 is a non-transitory machine-readable storage medium, tangibly embodying a set of instructions. When the instructions are executed by at least one processor, the instructions cause the at least one processor to perform operations. The operations include receiving at least a portion of data of a dataset, the dataset comprising a plurality of measures and a plurality of dimensions. The operations also include calculating a minimum and maximum magnitude of velocity for measures in the at least a portion of data of the dataset. The operations further include defining intervals in a range defined by the calculated minimum and maximum velocity, and selecting configuration settings for rendering a spatiotemporal visualization corresponding to the at least a portion of data of the dataset and the defined intervals. The operations also comprise generating the spatiotemporal visualization to be displayed to a user in a graphical user interface of a device, the spatiotemporal visualization comprising a graphical representation of the at least a portion of data, the at least a portion of data comprising at least one of the plurality of measures and at least one of the plurality of dimensions over the defined intervals. The operations further comprise causing display, in the graphical user interface of the device: the spatiotemporal visualization; and a plurality of selectable interaction controls corresponding to the spatiotemporal visualization.

Example 18 is the storage medium of Example 17, where the operations further include: detecting user interaction with one or more of the plurality of selectable interaction controls; determining one or more selections corresponding to the detected user interaction with the one or more of the selectable interaction controls; modifying the spatiotemporal visualization based on the one or more selections; and causing display, in the graphical user interface of the device, the re-generated spatiotemporal visualization.

Example 19 is the storage medium of Examples 17 or 18, where the plurality of dimensions comprise a goal for the at least one of the plurality of measures, the goal corresponding to a planning model.

Example 20 is the storage medium of Examples 17-20, where the defined intervals include future time intervals in the planning model, and the plurality of measures include numeric values corresponding to predicted performance metrics in the future time intervals.

Example Mobile Device

Figure 14:
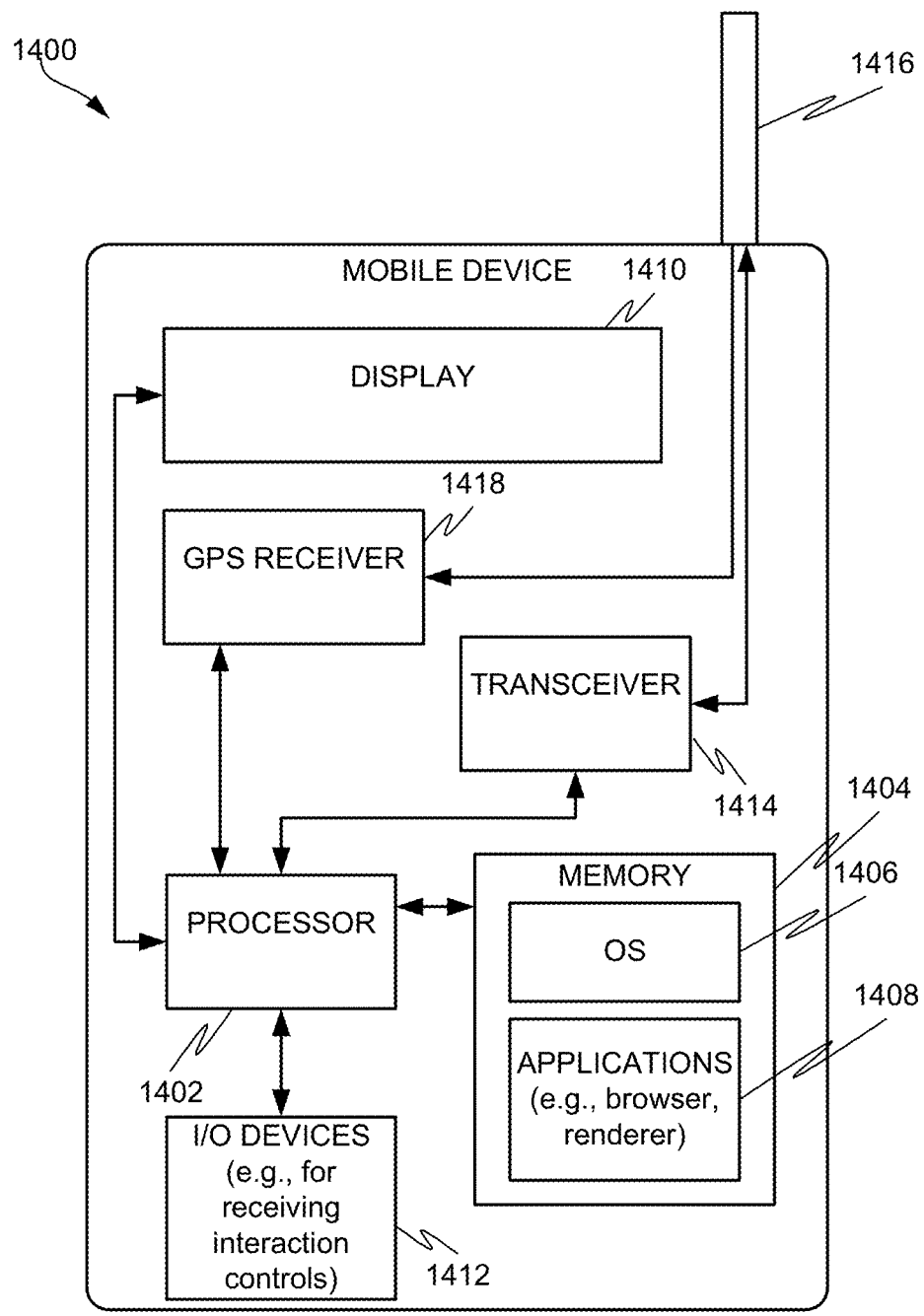
FIG. 14 is a block diagram illustrating a mobile client device on which spatiotemporal renderers described herein can be executed, in accordance with some example embodiments.

FIG. 14 is a block diagram illustrating a mobile device 1400, according to some example embodiments. The mobile device 1400 can include a processor 1402. The processor 1402 can be any of a variety of different types of commercially available processors suitable for mobile devices 1400 (for example, an XScale architecture microprocessor, a Microprocessor without Interlocked Pipeline Stages (MIPS) architecture processor, or another type of processor). A memory 1404, such as a random access memory (RAM), a Flash memory, or other type of memory, is typically accessible to the processor 1402. The memory 1404 can be adapted to store an operating system (OS) 1406, as well as application programs 1408, such as a mobile location-enabled application that can provide location-based services to a user. The processor 1402 can be coupled, either directly or via appropriate intermediary hardware, to a display 1410 and to one or more input/output (I/O) devices 1412, such as a keypad, a touch panel sensor, a microphone, and the like.

Similarly, in some example embodiments, the processor 1402 can be coupled to a transceiver 1414 that interfaces with an antenna 1416. The transceiver 1414 can be configured to both transmit and receive cellular network signals, wireless data signals, or other types of signals via the antenna 1416, depending on the nature of the mobile device 1400. Further, in some configurations, a GPS receiver 1418 can also make use of the antenna 1416 to receive GPS signals.

Modules, Components and Logic

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the network 114 of FIG. 1) and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 15:
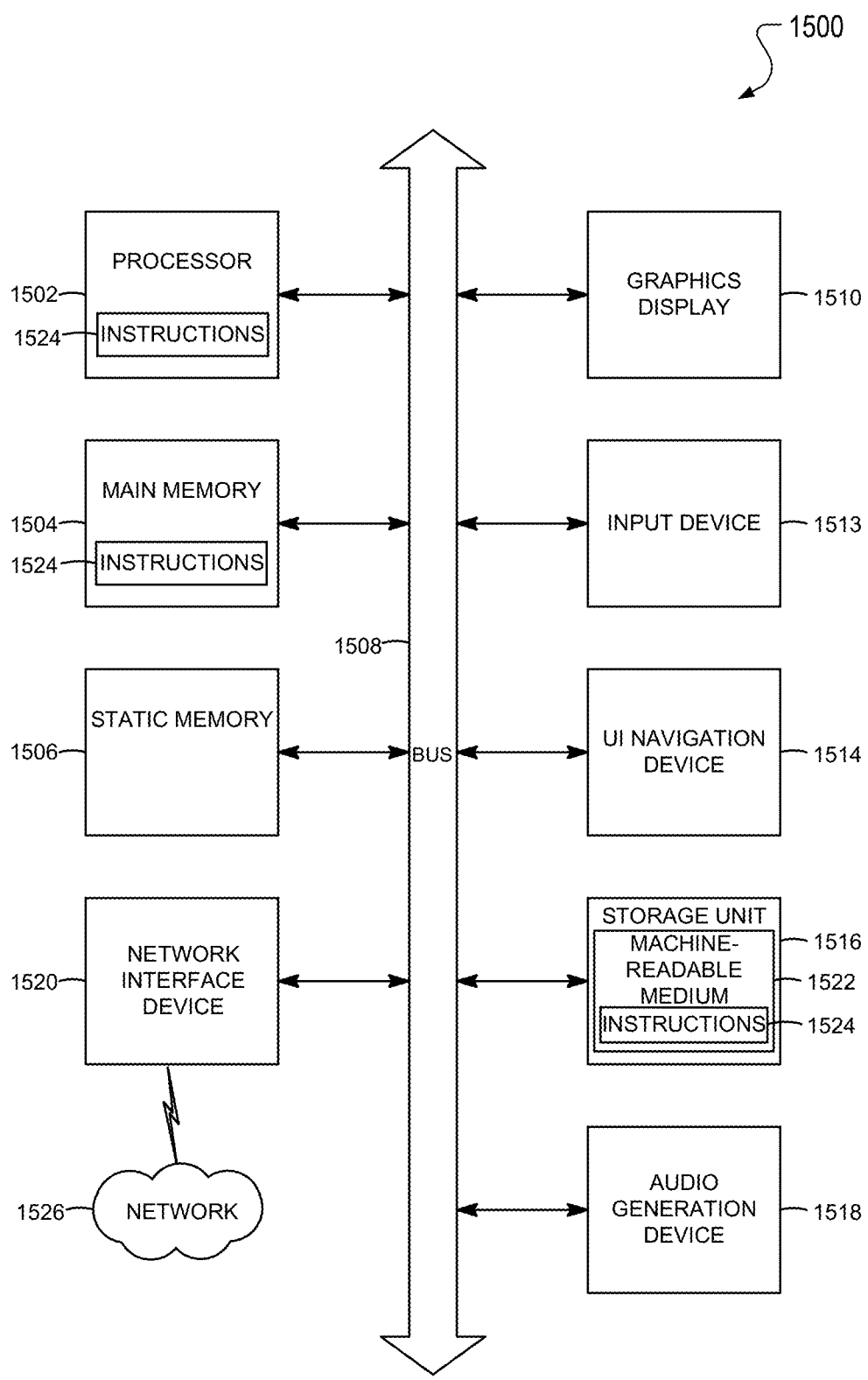
FIG. 15 is a block diagram of an example computer system on which methodologies described herein can be executed, in accordance with some example embodiments.

FIG. 15 is a block diagram of a machine in the example form of a computer system 1500 within which instructions 1524 for causing the machine to perform any one or more of the methodologies discussed herein can be executed, in accordance with some example embodiments. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 can further include a video/graphics display unit 1510 (e.g., a liquid crystal display (LCD) or a cathode ray tube (CRT)). The computer system 1500 also includes an alphanumeric input device 1512 (e.g., a keyboard), a user interface (UI) navigation (or cursor control) device 1514 (e.g., a mouse), a disk drive storage unit 1516, a signal generation device 1518 (e.g., a speaker) and a network interface device 1520.

The storage unit 1516 includes a machine-readable medium 1522 on which is stored one or more sets of data structures and instructions 1524 (e.g., software) embodying or utilized by any one or more of the methodologies or functions described herein. The instructions 1524 can also reside, completely or at least partially, within the main memory 1504 and/or within the processor 1502 during execution thereof by the computer system 1500, the main memory 1504 and the processor 1502 also constituting machine-readable media. The instructions 1524 can also reside, completely or at least partially, within the static memory 1506.

While the machine-readable medium 1522 is shown in an example embodiment to be a single medium, the term "machine-readable medium" can include a single medium or multiple media (e.g., a centralized or distributed database, and/or associated caches and servers) that store the one or more instructions 1524 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1524 can further be transmitted or received over a communications network 1526 using a transmission medium. The instructions 1524 can be transmitted using the network interface device 1520 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more hardware processors; and
   a computer-readable medium coupled with the one or more hardware processors, the computer-readable medium comprising instructions executable by the one or more hardware processors to cause the system to perform operations comprising:
   receiving a plurality of data points, each data point of the plurality of data points comprising a measure;
   based on a first derivative of the measures of the plurality of data points, determining a velocity for each data point of the plurality of data points;
   generating a graphical representation of the data points based on the measures of the data points and the velocities of the data points, the graphical representation of the data points comprising a segment corresponding to a first data point of the plurality of data points, a size of the segment being based on the measure of the first data point;
   determining, based on the velocity of the first data point, a visual attribute of the segment corresponding to the first data point;
   causing display, in a graphical user interface of a device, of the graphical representation of the data points, the graphical representation of the data points being displayed in a first dedicated section of the graphical user interface; and
   causing display, in the graphical user interface of the device and concurrent with the display of the graphical representation of the data points, of a plurality of selectable interaction controls comprising controls for modifying the graphical representation of the data points, the plurality of selectable interaction controls being displayed in a second dedicated section of the graphical user interface.

2. The system of claim 1, wherein the operations further comprise:
   based on a second derivative of the measures of the plurality of data points, determining an inflection point;
   determining, based on a sign of the first derivative at the inflection point, a second visual attribute; and
   causing display, in the graphical representation of the data points and using the second visual attribute, of an element corresponding to the inflection point.

3. The system of claim 2, wherein the second visual attribute is a color.

4. The system of claim 1, wherein the operations further comprise:
   causing display, in the graphical user interface of the device, of a second graphical representation of a second plurality of data points; and
   causing display, in the graphical user interface of the device, of an element relating a second data point of the second plurality of data points to a third data point of the plurality of data points.

5. The system of claim 4, wherein the third data point of the plurality of data points is an inflection point.

6. The system of claim 4, wherein a time value of the first data point is equal to a time value of the second data point.

7. The system of claim 1, wherein the operations further comprise:
   detecting user interaction with a selectable interaction control of the plurality of selectable interaction controls;
   re-generating the graphical representation of the data points based on the detected user interaction; and
   causing display, in the graphical user interface, the re-generated graphical representation of the data points in the first dedicated section of the graphical user interface.

8. The system of claim 1, wherein the measure of the first data point is a numeric value corresponding to a performance metric.

9. A computer-implemented method comprising:
receiving a plurality of data points, each data point of the plurality of data points comprising a measure;
based on a first derivative of the measures of the plurality of data points, determining a velocity for each data point of the plurality of data points;
generating a graphical representation of the data points based on the measures of the data points and the velocities of the data points, the graphical representation of the data points comprising a segment corresponding to a first data point of the plurality of data points, a size of the segment being based on the measure of the first data point;
determining, based on the velocity of the first data point, a visual attribute of the segment corresponding to the first data point;
causing display, in a graphical user interface of a device, of the graphical representation of the data points, the graphical representation of the data points being displayed in a first dedicated section of the graphical user interface; and
causing display, in the graphical user interface of the device and concurrent with the display of the graphical representation of the data points, of a plurality of selectable interaction controls comprising controls for modifying the graphical representation of the data points, the plurality of selectable interaction controls being displayed in a second dedicated section of the graphical user interface.

10. The method of claim 9, further comprising:
based on a second derivative of the measures of the plurality of data points, determining an inflection point;
determining, based on a sign of the first derivative at the inflection point, a second visual attribute; and
causing display, in the graphical representation of the data points and using the second visual attribute, of an element corresponding to the inflection point.

11. The method of claim 10, wherein the second visual attribute is a color.

12. The method of claim 9, further comprising:
causing display, in the graphical user interface of the device, of a second graphical representation of a second plurality of data points; and
causing display, in the graphical user interface of the device, of an element relating a second data point of the second plurality of data points to a third data point of the plurality of data points.

13. The method of claim 12, wherein the first data point of the plurality of data points is an inflection point.

14. The method of claim 12, wherein the first data point has a time value equal to a time value of the second data point.

15. The method of claim 9, further comprising:
detecting user interaction with a selectable interaction control of the plurality of selectable interaction controls;
re-generating the graphical representation of the data points based on the detected user interaction; and
causing display, in the graphical user interface, the re-generated graphical representation of the data points in the first dedicated section of the graphical user interface.

16. The method of claim 9, wherein the measure of the first data point is a numeric value corresponding to a performance metric.

17. A non-transitory machine-readable storage medium, tangibly embodying a set of instructions that, when executed by at least one processor, causes the at least one processor to perform operations comprising:
receiving a plurality of data points, each data point of the plurality of data points comprising a measure;
based on a first derivative of the measures of the plurality of data points, determining a velocity for each data point of the plurality of data points;
generating a graphical representation of the data points based on the measures of the data points and the velocities of the data points, the graphical representation of the data points comprising a segment corresponding to a first data point of the plurality of data points, a size of the segment being based on the measure of the first data point;
determining, based on the velocity of the first data point, a visual attribute of the segment corresponding to the first data point;
causing display, in a graphical user interface of a device, of the graphical representation of the data points, the graphical representation of the data points being displayed in a first dedicated section of the graphical user interface; and
causing display, in the graphical user interface of the device and concurrent with the display of the graphical representation of the data points, of a plurality of selectable interaction controls comprising controls for modifying the graphical representation of the data points, the plurality of selectable interaction controls being displayed in a second dedicated section of the graphical user interface.

18. The machine-readable storage medium of claim 17, wherein the operations further comprise:
based on a second derivative of the measures of the plurality of data points, determining an inflection point;
determining, based on a sign of the first derivative at the inflection point, a second visual attribute; and
causing display, in the graphical representation of the data points and using the second visual attribute, of an element corresponding to the inflection point.

19. The machine-readable storage medium of claim 18, wherein the second visual attribute is a color.

20. The machine-readable storage medium of claim 17, wherein the operations further comprise:
causing display, in the graphical user interface of the device, of a second graphical representation of a second plurality of data points; and
causing display, in the graphical user interface of the device, of an element relating a second data point of the second plurality of data points to a third data point of the plurality of data points.

* * * * *